United States Patent [19]

Duchesne

[11] 4,350,189
[45] Sep. 21, 1982

[54] APPARATUS AND METHOD FOR DEBRANCHING FELLED TREES

[75] Inventor: Ghislain Duchesne, Metabetchouan, Canada

[73] Assignee: Lar Machinerie Inc., Quebec, Canada

[21] Appl. No.: 188,285

[22] Filed: Sep. 18, 1980

[30] Foreign Application Priority Data

Sep. 12, 1980 [CA] Canada .................................. 360164

[51] Int. Cl.³ .............................................. A01G 23/02
[52] U.S. Cl. ..................................... 144/2 Z; 144/343
[58] Field of Search ................ 144/2 Z, 3 D, 309 AC

[56] References Cited

U.S. PATENT DOCUMENTS 3,620,272 11/1971 Eriksson ............................. 144/2 Z
3,635,266 1/1972 Eriksson ............................. 144/2 Z
3,987,826 10/1976 McKenzie ........................... 144/2 Z
4,276,918 7/1981 Siqouin ............................... 144/2 Z Primary Examiner—W. D. Bray
Attorney, Agent, or Firm—Cushman, Darby & Cushman

[57] ABSTRACT

The disclosure herein describes an extendable and retractable longitudinal boom mounted on a vehicle supported boom processing member and equipped with first gripping and debranching elements mounted at one end thereof to grasp a felled tree and to remove branches therefrom; second tree gripping elements mounted to the boom processing member for grasping the tree trunk adjacent its butt end after the tree has been grasped by the first tree gripping elements and the boom retracted in the member to bring the butt end to the second tree gripping elements; means are provided to pivot the second tree gripping elements laterally at an angle with respect to the longitudinal axis of the boom so as to move the butt end away from the member and to allow rearward retracting of the tree trunk as the boom is retracted; this arrangement enables debranching of the tree over an additional length.

9 Claims, 6 Drawing Figures

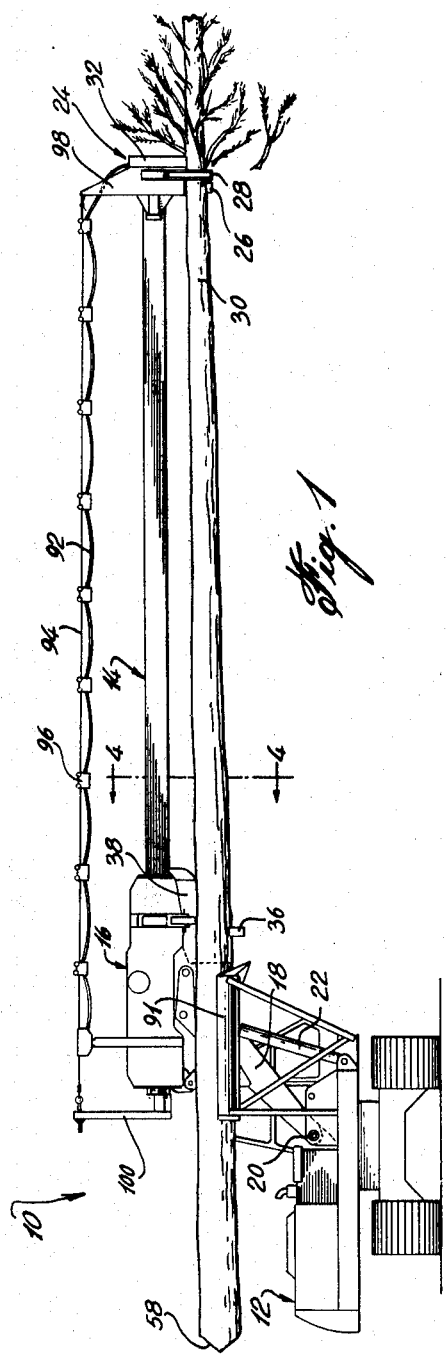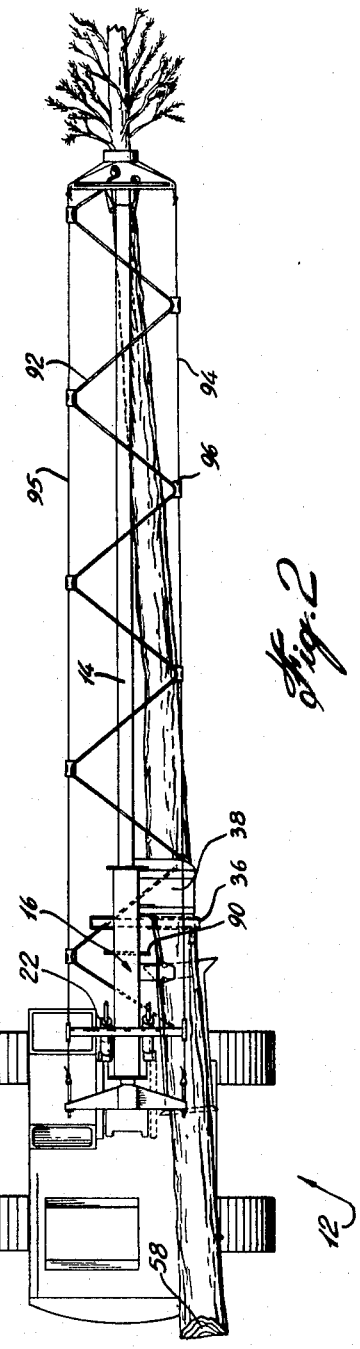

APPARATUS AND METHOD FOR DEBRANCHING FELLED TREES

FIELD OF THE INVENTION

The present invention pertains to a method of debranching felled trees and to an apparatus therefor.

BACKGROUND OF THE INVENTION

One example of present tree processing units may be found described in Canadian Pat. No. 1,055,366 issued May 29, 1979 to Roger Sigouin. Such unit comprises a boom processing member, supported on a vehicle, which causes extension and retraction of a longitudinal boom having, at one end, tree gripping and debranching elements adapted to grasp a felled tree and to remove branches therefrom; second tree gripping elements are mounted to the member and are adapted to grasp the tree trunk adjacent its butt end so that debranching may be carried out by extending the boom as the first gripping elements loosely hold the tree. However, with such equipment, tree debranching is limited since, in most cases, the length of the cut tree is longer than the maximum length of the boom in the extended position. Hence, shear elements are provided at the front end of the boom to cut off the remaining un-delimbed portion of the tree, which portion is left to waste at the tree cutting site. It is noted that the number of un-delimbed tree portions represent a considerable loss of an important resource.

OBJECTS AND STATEMENT OF THE INVENTION

It is an object of the present invention to provide on the type of vehicle described a mechanism which enables a tree to be debranched over substantially all of its length. This is achieved by mounting to the boom processing member pivoting means which allow the tree trunk to be oriented sideways to the boom processing member so that once a first length of the tree has been delimbed, the tree may be retracted along the side of the member so that a second delimbing operation can be effected on the remaining portion of the tree.

The present invention therefore pertains to an apparatus for debranching a felled tree which comprises in its broadest aspect: a vehicle; a boom processing member supported on the vehicle; an extendable and retractable longitudinal boom mounted to the member; first tree gripping means and debranching means mounted on one end of the boom and arranged to grasp a felled tree trunk and to remove branches therefrom; second tree gripping means mounted to the boom processing member for grasping the tree trunk adjacent its butt end after the felled tree has been grasped by the first tree gripping means and the boom retracted in the member to bring the butt end to the second tree gripping means, the longitudinal axis of the tree held by the first and second tree gripping means being substantially parallel to the axis of the longitudinal boom; the second gripping means holding the tree trunk as the boom is fully extended and the debranching means move along the tree; and means on the boom processing member for pivoting the second tree gripping means laterally so as to move the butt end away from the member to position the tree at an angle with respect to the longitudinal axis of the boom to allow rearward retracting of the tree trunk as the boom is retracted with the first gripping means in grasping arrangement and the second gripping means in a non-grasping position; the second gripping means being subsequently brought in grasping engagement with the tree trunk and the boom extended to effect an additional debranching length of the tree trunk by said debranching means.

The present invention also relates to a method for debranching a felled tree over substantially all of its length with the apparatus described above.

Other objects, purposes and characteristic features of the present invention will be in part obvious from the accompanying drawings and in part pointed out as the description of the invention progresses. In describing the invention in detail reference will be made to the accompanying drawings, in which like reference characters designate corresponding parts throughout the several views. It should be understood, however, that this detailed description, while indicating preferred embodiments of the invention, is given by way of illustration only since various changes and modifications within the spirit and scope of the invention will be apparent to those skilled in the art.

IN THE DRAWINGS

FIG. 1 is a side elevational view of a tree processing unit embodying the present invention;

FIG. 2 is a top plan view thereof;

DESCRIPTION OF PREFERRED EMBDOIMENT

Figure 3:
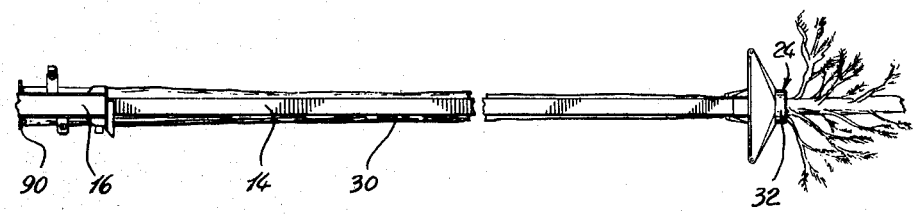
FIG. 3 is a top plan view showing the tree trunk after the first delimbing operation.

Referring to FIG. 1, there is shown a tree processing unit 10 which broadly comrises a track propelled vehicle 12, a longitudinal boom 14 and a boom processing member 16. The boom 14 is extendable and retractable through the boom processing member 16, the construction of which is well known and may be found described in the above referred Canadian patent. The boom processing member 16 is mounted to the vehicle by means of a supporting frame 18 which is pivoted at 20 so that the boom may be tilted with respect to the vehicle to grasp a tree on the ground. In FIG. 1, an hydraulic cylinder 22 is shown for tilting the supporting frame 18.

A first series of gripping and debranching means 24 is provided at the foremost end of boom 14; these means 24 may consist of a pair of clamps 26,28 having a semicircular shape and adapted to grasp a tree 30 therebetween. Also, mounted at this end of the boom, are cutting means 32 which are used to cut off the extremity of the trees.

Figure 6:
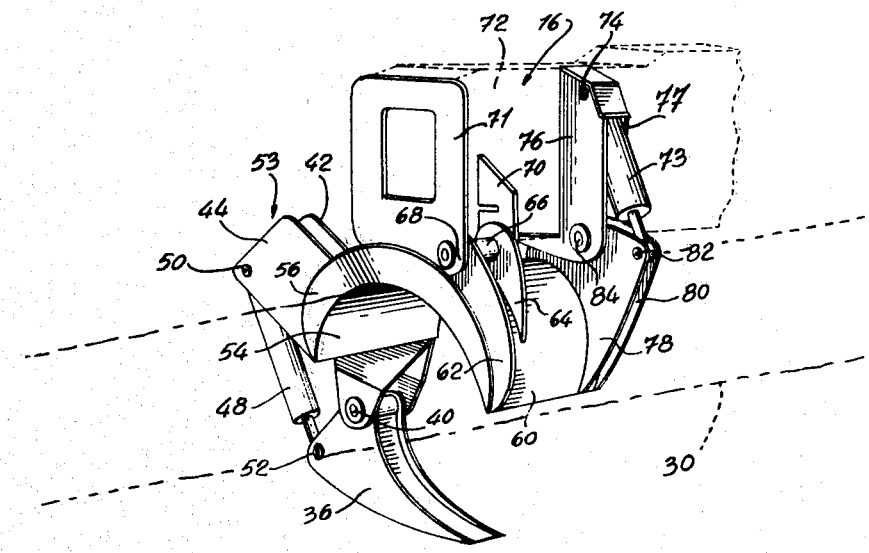
FIG. 6 is a perspective view of the pivoting mechanism shown in FIG. 5.
Figure 4:
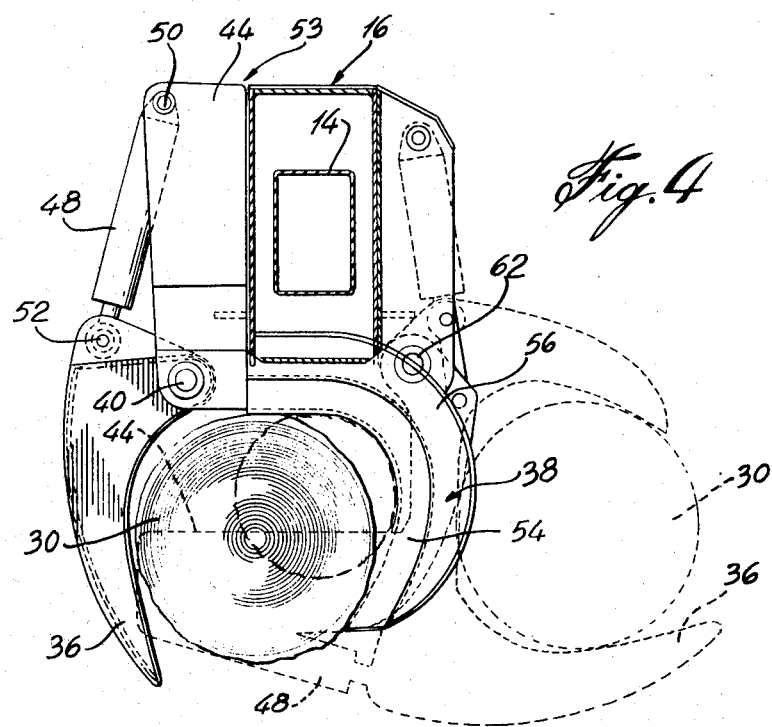
FIG. 4 is an enlarged cross-sectional view as seen from lines 4—4 of FIG. 1.
Figure 5:
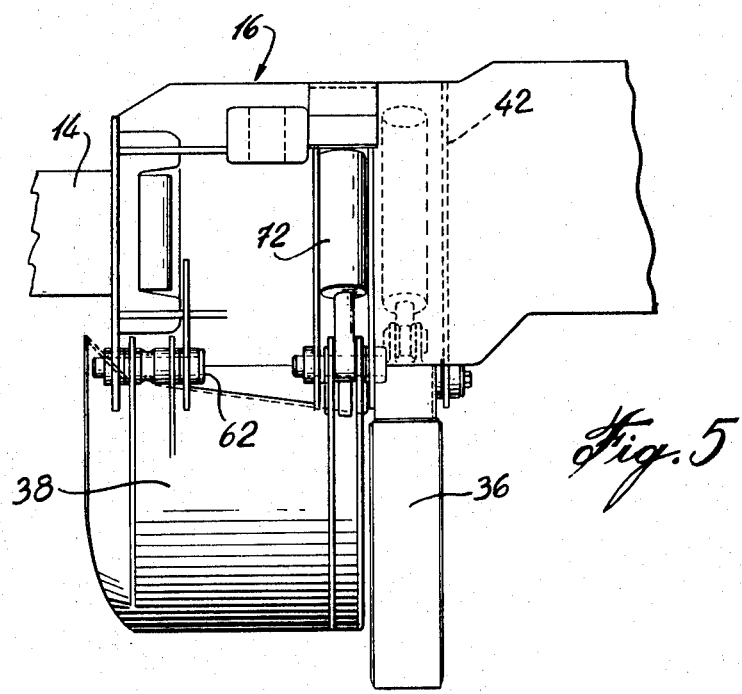
FIG. 5 is a side elevational view of the pivoting mechanism mounted to the boom processing member of the present invention.

A second series of gripping elements are mounted to the boom processing member 16 and consist of a clamp 36 and a semi-funnel shaped backing plate 38. Referring to FIGS. 4, 5 and 6, a more detailed description of the second tree gripping elements 34 will now be given. Clamp 36 is pivotally mounted at 40 to a pair of plates 42,44 between which is housed an hydraulic cylinder 48 with its upper end pivotally mounted at 50 to the plates and its lower end pivotally mounted at 52 to clamp 36. The assembly of plates 42,44 define the upstanding portion 53 of a pivoting assembly that includes the backing plate 38, the lower edges of plates 42,44 being fixedly mounted, by welding, to the outer wall 60 of backing member 38. A pair of plates 62,64 supported on a pivot pin 66 is also welded to the outer wall 60. Pin 66 is rotatably mounted to the boom processing member through plates 70 and 71 fixed to the hollow body 72 of the member 16. Hence, the assembly of the backing plate 38 and the upstanding portion 53 carrying clamp 36 may be pivoted with respect to the boom processing member 16 about pin 66. The pivoting of this assembly is carried out by means of a cylinder 73 which has its upper portion pivotally attached at 74 to a pair of L-shaped plates 76 and 77 fixedly mounted to the outside wall of the boom processing member body 72. The lower end of cylinder 72 is pivotally attached at 82 to two parallel plates 78,80 welded to the outer wall of the backing plate 38 and further pivotally supported at 84 to plates 76 and 77. Axis 84 is horizontally aligned with that of pin 66. Hence, actuation of the piston of cylinder 73 causes the pivot of the assembly of backing plate 38 and the clamp supporting portion 53 about the axes of pins 66 and 84.

A description of the operation of the apparatus embodying the present invention will now be described. A felled tree is first pick up by clamps 26,28 after the boom and boom processing member have been tilted with respect to the vehicle by means of the hydraulic jack 22. The boom is retracted so that the butt end 58 of the tree is brought to rest against a stop plate 90 (see FIG. 3) fixed to the boom processing body 72. In this position, the axis of the tree is substantially parallel to that of the boom. Cylinder 48 is then actuated so that clamp 36 presses the tree against the backing plate 38. Clamps 26,28 are slightly released leaving a small distance between the inner surfaces of the clamps and the tree. The boom is then extended effecting a debranching operation of the tree until boom 14 reaches its most extended position. Thereafter, in accordance with the present invention, cylinder 73 is actuated to cause the pivot of the tree carrying assembly of clamp 36 and backing plate 38 outwardly to enable the butt end 58 to free the stop plate 90 and the boom processing member. Hence, in the position shown in FIG. 2, the tree has now an axis which is at an angle to the axis of boom 14. Clamp 36 is slightly released while clamps 26,28 again tightly grasp the tree. Boom 14 is then retracted causing the tree trunk to move rearwardly sliding on a guide member 91 supported on the vehicle 12. After clamps 26,28 is near the boom processing member 18, clamp 36 once again forces the tree trunk against the backing plate 38 and clamps 26,28 are slightly released so that a further extension of the boom once again will cause an additional delimbing of the tree to a given distance from the top of the tree. Then, shears 32 are actuated to clip off the top. This operation may be carried out until substantially all the tree is fully delimbed. Subsequently, clamps 26,28 may be used to deposit the delimbed tree trunk at a desired location on the site.

The operation of the various moving components 26,28 and 32 at the front end of the boom is carried out from the vehicle through a series of hydraulic cables 92 supported on cables 94,95 by means of rollers 96, the cables extending from two inclined supports 98 and 100 mounted at the front and rear ends of the boom 14.

The embodiments of the invention in which an exclusive property or privilege is claimed are defined as follows:

1. Apparatus for debranching a felled tree comprising:
   a vehicle;
   a boom processing member supported on said vehicle;
   an extendable and retractable longitudinal boom mounted through said member;
   first tree gripping means and debranching means mounted at one end of said boom and arranged to grasp a felled tree trunk and to remove branches therefrom;
   second tree gripping means mounted to said boom processing member for grasping the tree trunk adjacent its butt end after said felled tree trunk has been grasped by said first tree gripping means and said boom retracted in said member to bring said butt end to said second tree gripping means, the longitudinal axis of said tree held by said first and second tree gripping means being substantially parallel to the axis of said longitudinal boom; said second gripping means holding said tree trunk as said boom is fully extended and said debranching means move along said tree;
   means on said boom processing member for pivoting said second tree gripping means laterally so as to move said butt end away from said member and to position said tree at an angle with respect to the longitudinal axis of said boom to allow rearward retracting of said tree trunk as said boom is retracted with said first gripping means in grasping arrangement and said second gripping means being subsequently brought in grasping engagement with said tree trunk and said boom extended to effect an additional debranching length of said tree trunk by said debranching means; and
   guide means on said vehicle for slidably receiving thereon said butt end as said tree trunk is moved rearwardly relative to the boom processing member.

2. An apparatus as defined in claim 1, further comprising shear means at said one end of said boom for cutting said tree trunk.

3. An apparatus as defined in claim 1, wherein said second tree gripping means include a jaw member and a backing plate; means on said backing plate for moving said jaw member relative to said backing plate to grasp or to free a tree trunk therebetween.

4. An apparatus as defined in claim 3, wherein said backing plate is half-funnel shaped.

5. An apparatus as defined in claim 3, wherein said means for moving said jaw member and said means for pivoting said backing plate are hydraulically operated.

6. A method for debranching a felled tree trunk over substantially the entire length thereof, comprising:
   (a) grasping the tree trunk with first gripping and debranching means mounted at one end of an extendable and retractable boom extending through a vehicle supported boom processing member;
   (b) retracting said boom to bring the butt end of the tree trunk to a second gripping means mounted to said boom processing member where said second gripping means grasp said butt end;
   (c) extending said boom to delimb a first length of said tree trunk by said debranching means;
   (d) pivoting laterally said second gripping means to free said butt end from said boom processing member and to set said tree trunk at an angle with respect to said boom;

(e) retracting said boom to retract said tree trunk along the side of said boom processing member, said retracting step being carried out until said first length of said tree trunk has passed said second gripping means;

(f) extending said boom to delimb a second length of said tree trunk.

7. A method as defined in claim 6, wherein steps (e) and (f) are repeated until substantially the entire length of tree is debranched.

8. A method as defined in claim 7, cutting said tree trunk at a given length by shear means mounted at said one end of said boom.

9. A method as defined in claim 6, wherein, during steps (c) and (f) said first gripping means loosely grip said tree trunk; and during step (e), said second gripping means loosely grip said tree trunk.

* * * * *